March 9, 1943.  J. MORELLE  2,313,204
COLLIMATOR
Filed Sept. 12, 1939
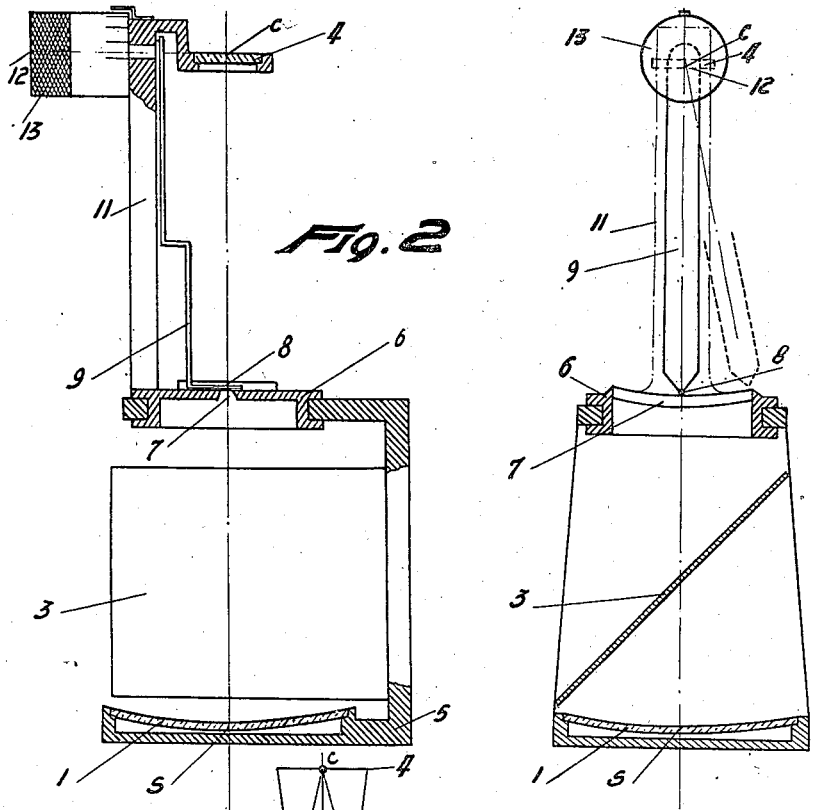
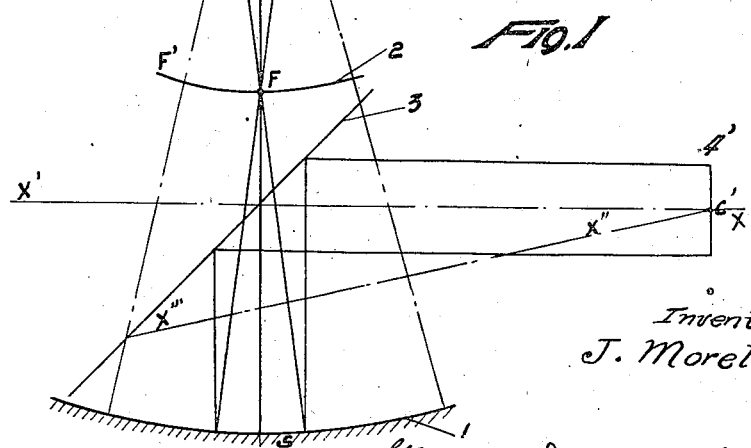
Inventor,
J. Morelle
By: Glascock Downing & Seebold
Attys.

Patented Mar. 9, 1943

2,313,204

UNITED STATES PATENT OFFICE 2,313,204

COLLIMATOR

Jules Morelle, Paris, France; vested in the Alien Property Custodian

Application September 12, 1939, Serial No. 294,523
In France December 12, 1938

1 Claim. (Cl. 88—2.3)

It is often necessary, more particularly in aiming devices, to determine a fixed direction and this is generally obtained by means of apparatuses termed collimators and comprising essentially an object glass, a reticle disposed at the focus thereof and a semireflecting glass plate.

But it is also often required to determine not only a principal direction but also auxiliary directions forming therewith substantial angles; in said case it becomes necessary to use an object glass without aberration and such an object glass is always complicated and comprises at least three lenses which absorb a substantial part of the light.

The present invention has for its object a collimator avoiding said drawbacks and allowing to determine besides a principal direction, auxiliary directions forming substantial angles therewith, and comprising a concave mirror; a reticle disposed in the focal surface thereof, means for illuminating said reticle and means for displacing a mark throughout the area thereof; a semireflecting glass plate so disposed that it reflects in the observer's eye the infinitely removed image of the reticle produced by reflection on the concave mirror.

Another object of the invention is a form of execution of such a collimator wherein the reticle is an opaque plate, rotatable round the mirror axis and provided with a spherical slit the centre of which is the same as that of the mirror; a small screen is movable along said slit and its image appears to the observer as an infinitely removed black point determining the desired direction.

In order that the invention may be clearly understood and readily carried into effect a collimator embodying the invention will now be more fully described by way of example with reference to the accompanying drawing in which:

Figure 1 is a diagram showing the path of the light rays.

Figs. 2 and 3 are cross-sections in two directions perpendicular to one another of a form of execution of the apparatus.

Fig. 1 allows to understand easily the working of the apparatus. In said figure, 1 is a spherical concave mirror, the vertex of which is in S, the centre in C and the focus in F equidistant from S and C; 2 is a spherical reticle concentric to the mirror 1 and disposed at the focus F; 3 is a semitransparent glass plate and in C is a luminous surface 4 illuminating the reticle 2.

The light beam emitted by 4 and passing through point F of the reticle passes, at least in part, across the glass plate 3, is reflected further on the concave mirror 1 and forms then a cylindrical beam, a part of this latter is reflected on the glass plate 3 and becomes a cylindrical beam the axis of which is $xx'$ and the basis an image $4'$ of the luminous surface 4; said last mentioned beam impinging in the observer's eye, this latter perceives an infinitely removed image of the point F, by instance if the reticle was opaque and provided only with a small aperture disposed at F, said observer would see an infinitely removed punctiform luminous spot in the direction $xx'$, said spot determining the principal direction.

If the aperture in the opaque reticle was made in $F'$, instead of F, the working would be the same except that the luminous spot would be seen in the direction $x''x'''$ instead of $xx'$ and would thus determine the auxiliary direction $x''x'''$.

It would be possible to use as reticle a cylindrical plate the axis of which would pass through C and provided with a slit cut through a plane passing by the mirror axis CS, said slit being thus on a sphere having its center in C and passing through F. If a small screen covering only a slight part of said slit was movable therealong and if the whole of said reticle was capable to rotate round axis CS, said device would be similar to an opaque spherical reticle wherein an aperture might be made at any desired point throughout its area, the observer would then perceive an infinitely removed luminous line, image of the illuminated slit, said line being interrupted at a certain point by the image of the screen, said interruption indicating the required auxiliary direction such as $x''x'''$ of Figure 1.

Figures 2 and 3 illustrate a form of execution of the collimator the working of which has been disclosed hereinabove. The reference letters and numbers correspond to the same parts on the three figures.

The spherical mirror 1 and the semireflecting glass plate 3 are arranged in a casing 5, in the upper part of which is provided a circular opening the center of which is on the axis CS of the mirror. In said opening a ring 6 may rotate, in the inside of said ring is fixed a plate shaped as a cylinder whose axis passes through C. A slit 7 is cut in said plate in the plane perpendicular to the axis thereof passing through CS, and before said slit a small screen 8 may be displaced so that it covers only a very slight part thereof, said screen is supported by an arm 9 rotatably mounted on a stem 11 fixed on the ring 6; the rotation axis of the arm 9 passes through C and said arm may be rotated by means of a knob 13.

It will be understood that if we move the screen by means of knob 13 and if we rotate the ring round CS it is possible to bring said screen in any desired point of the area enclosed by the ring and therefore to determine an auxiliary direction such as $x''x'''$ forming any desired angle with the principal direction.

On the stem 11 is also fixed the light source 4, constituted say by a light spreading surface illuminated by a lamp, or by the image of another luminous surface produced by a suitable optic system.

Modifications may be brought to the above disclosed device without widening the scope of the invention; say the mirror may be made of glass the rear surface of which is made reflecting, the curvatures of both surfaces being different.

The spherical mirror might be also replaced by a parabolic one the point F being the focus of the parabola meridian curve of said mirror and the center C being that of the osculating circle at the vertex of said parabola.

What I claim is:

A collimator adapted to determine exactly not only a principal direction but also auxiliary directions forming substantial angles with said principal direction, comprising: a spherical concave mirror, an opaque plate able to rotate round said mirror axis, said plate being shaped as a revolution cylinder the radius of which is equal to the half of the radius of said mirror, and said cylindrical plate being disposed so that its axis passes through the center of the mirror and is perpendicular to the axis thereof, said plate being also provided with a slit the plane of which is perpendicular to its axis: a screen adapted to hide a part of said slit: a light source disposed at the center of the spherical mirror and adapted to illuminate said slit: a semitransparent glass plate so disposed between the slit and the spherical mirror that it reflects in the observer's eye the infinitely removed luminous image of the slit partially hidden by the screen formed by the spherical concave mirror: means for displacing said screen before said slit so that its image, after reflection in the spherical mirror is seen by the observer in the desired auxiliary direction.

JULES MORELLE.